(12) United States Patent
Lopez et al.

(10) Patent No.: US 11,370,172 B2
(45) Date of Patent: Jun. 28, 2022

(54) COOLING A 3D BUILD VOLUME

(71) Applicant: HEWLETT-PACKARD DEVELOPMENT COMPANY, L.P., Spring, TX (US)

(72) Inventors: Matthew G Lopez, San Diego, CA (US); Edmund R Nowak, San Diego, CA (US); Frank Kozakiewicz, San Diego, CA (US); Brian R Jung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,736

(22) PCT Filed: Apr. 23, 2018

(86) PCT No.: PCT/US2018/028773
§ 371 (c)(1),
(2) Date: Oct. 24, 2019

(87) PCT Pub. No.: WO2019/209237
PCT Pub. Date: Oct. 31, 2019

(65) Prior Publication Data
US 2021/0331409 A1    Oct. 28, 2021

(51) Int. Cl.
*B29C 64/393* (2017.01)
*B33Y 10/00* (2015.01)
*B33Y 30/00* (2015.01)
*B33Y 50/02* (2015.01)
*B29C 64/153* (2017.01)
(Continued)

(52) U.S. Cl.
CPC .......... *B29C 64/393* (2017.08); *B29C 64/153* (2017.08); *B29C 64/20* (2017.08); *B33Y 10/00* (2014.12); *B33Y 30/00* (2014.12); *B33Y 40/20* (2020.01); *B33Y 50/02* (2014.12)

(58) Field of Classification Search
CPC ..... B29C 64/393; B29C 64/20; B29C 64/153; B33Y 50/02; B33Y 40/20; B33Y 10/00; B33Y 30/00
See application file for complete search history.

(56) References Cited

U.S. PATENT DOCUMENTS

2015/0360421 A1    12/2015 Burhop et al.
2017/0008233 A1    1/2017  Vontorcik et al.
(Continued)

FOREIGN PATENT DOCUMENTS

CN    204172363 U    2/2015
EP    3263316 A1    1/2018
(Continued)

*Primary Examiner* — Nahida Sultana
(74) *Attorney, Agent, or Firm* — Dierker & Kavanaugh PC

(57) ABSTRACT

In an example implementation, a method of cooling a 3D build volume includes receiving a 3D object model that represents a 3D part to be formed in a build volume, and determining a placeholder position for forming a placeholder part within the build volume. Based on the placeholder position, a 3D part position is determined for forming the 3D part within the build volume. The method also includes controlling components of a 3D printing system to form the placeholder part in the placeholder position within the build volume and to form the 3D part in the 3D part position within the build volume.

14 Claims, 6 Drawing Sheets

(51) Int. Cl.
    *B29C 64/20*         (2017.01)
    *B33Y 40/20*         (2020.01)

(56) References Cited

U.S. PATENT DOCUMENTS

| | | | |
|---|---|---|---|
| 2018/0079141 A1 | 3/2018 | Yoshida et al. | |
| 2019/0134889 A1* | 5/2019 | Roman | B33Y 40/00 |
| 2020/0147863 A1* | 5/2020 | Coulter | B29C 64/295 |

FOREIGN PATENT DOCUMENTS

| | | |
|---|---|---|
| EP | 3272542 A1 | 1/2018 |
| WO | WO2016196382 A1 | 12/2016 |
| WO | WO2017196355 A1 | 11/2017 |
| WO | WO2017196383 A1 | 11/2017 |
| WO | WO2018022046 A1 | 2/2018 |

* cited by examiner

COOLING A 3D BUILD VOLUME

BACKGROUND

Additive manufacturing processes can produce three-dimensional (3D) objects by providing a layer-by-layer accumulation and solidification of build material patterned from digital 3D object models. In some examples, inkjet printheads can selectively print (i.e., deposit) liquid functional agents such as fusing agents or binder liquids onto layers of build material in areas that are to form layers of the 3D object. The liquid agents can facilitate the solidification of the build material within the printed areas. In some examples, fusing energy can be applied to a layer to thermally melt and fuse together build material in the printed areas where a liquid fusing agent has been applied. The solidification of the printed areas of build material can form 2D cross-sectional layers of the 3D object being produced, or printed.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
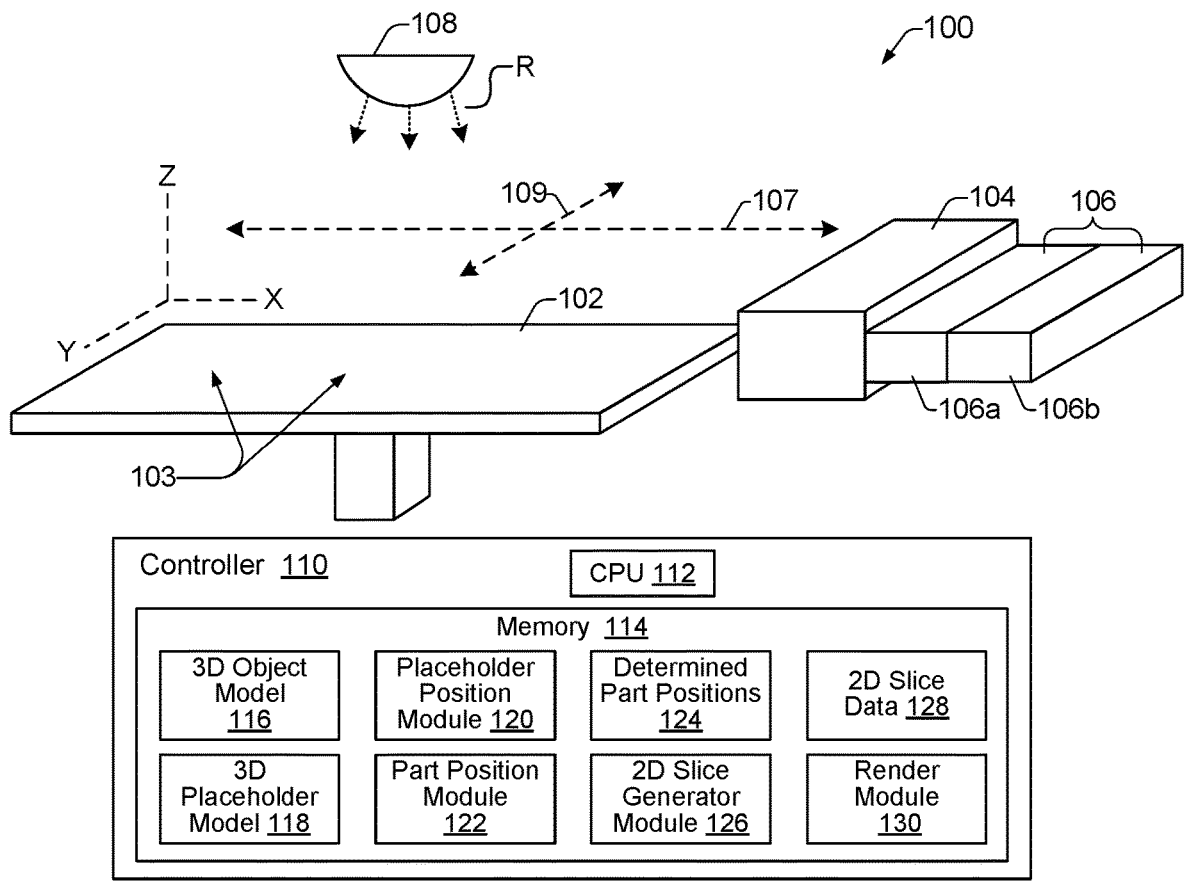
FIG. 1 shows a block diagram of an example of a 3D printing system suitable for producing a 3D build volume with cooling conduit placeholders to expedite cooling of the 3D build volume.

In some additive manufacturing processes, such as some 3D printing processes, for example, 3D objects or parts can be formed on a layer-by-layer basis where each layer is processed and portions thereof are combined with a subsequent layer until the 3D object is fully formed. Throughout this description, the terms 'part' and 'object' and their variants may be used interchangeably. In addition, while a particular powder-based and fusing agent 3D printing process is used throughout this description as one example of a suitable additive manufacturing process, concepts presented throughout this description may be similarly applicable to other processes such as binder jetting, laser metal deposition, and other powder bed-based processes. Furthermore, while build material is generally referred to herein as being powdered build material, such as powdered nylon, there is no intent to limit the form or type of build material that may be used when producing a 3D object from a 3D digital object model. Various forms and types of build materials may be appropriate and are contemplated herein. Examples of different forms and types of build materials can include, but are not limited to, short fibers that have been cut into short lengths or otherwise formed from long strands or threads of material, and various powder and powder-like materials including plastics, ceramics, metals, and the like.

In various powder-based 3D printing processes and other additive manufacturing processes, layers of a 3D object can be produced from 2D slices of a digital 3D object model, where each 2D slice defines portions of a powder layer that are to form a layer of the 3D object. Information in a 3D object model, such as geometric information that describes the shape of the 3D model, can be stored as plain text or binary data in 3D file formats, such as STL, VRML, OBJ, FBX, COLLADA, 3MF, and so on. Some 3D file formats can store additional information about 3D object models, such as information indicating colors, textures and/or surface finishes, material types, and mechanical properties and tolerances.

The information in a 3D object model can define solid portions of a 3D object to be printed or produced. To produce a 3D object from a 3D object model, the 3D model information can be processed to provide 2D planes or slices of the 3D model. In different examples, 3D printers can receive and process 3D object models into 2D slices, or they can receive 2D slices that have already been processed from 3D object models. Each 2D slice generally comprises an image and/or data that can define an area or areas of a layer of build material (e.g., powder) as being solid part areas where the powder is to be solidified during a 3D printing process. Thus, a 2D slice of a 3D object model can define areas of a powder layer that are to receive (i.e., be printed with) a liquid functional agent such as a fusing agent. Conversely, areas of a powder layer that are not defined as part areas by a 2D slice, comprise non-part areas where the powder is not to be solidified. Non-part areas may receive no liquid functional agent, or they may receive a detailing agent that can be selectively applied around part contours, for example, to cool the surrounding build material and keep it from fusing.

In some example powder-based and fusing agent 3D printing systems, layers of powdered build material can be spread over a platform or print bed and processed within a build area. A block of build material, or build volume, develops as more and more layers are spread and processed within the build area. As noted above, a liquid functional agent (e.g., a fusing agent) can be selectively applied to some powder layers in areas where the particles of powdered material are to be fused together or solidified to form a part or parts as defined by 2D slices of a 3D object model. The layers can be exposed to a fusing energy to thermally fuse together and solidify the particles of powdered material where the fusing agent has been applied. This process can be repeated, one layer at a time, until a 3D part or 3D parts have been formed within a build volume of the build area.

The build volume comprises a block of heated build material that contains one or multiple solidified 3D parts within the block. The condition of the powder surrounding 3D parts within a build volume generally ranges from partially fused powder to loosely bound powder from which the parts can be excavated, for example, by manually or otherwise breaking apart the powder and removing the parts.

Extracting 3D parts from the heated build volume can involve a number of post printing steps. For example, an initial post printing step can include cooling the build volume and the 3D printed parts within the build volume to an "equilibrium temperature". An equilibrium temperature is a temperature at which the build volume is cool enough to avoid hazards during handling of the build volume and avoid warpage of the parts when they are extracted from the volume. In some examples, the temperature of the heated build volume after printing can be on the order of 204° C. An equilibrium temperature that can allow for safe handling of the build volume and removal of the parts from the build volume can be on the order of 66° F.

Reducing the amount of time to cool the build volume to an equilibrium temperature can help reduce part warpage and improve overall printing system efficiency. However, the amount of time to cool a build volume down to an equilibrium temperature can be significant. In some examples, a build volume can be removed from the 3D printing system on a trolley system or other conveyance system and allowed to cool over a period of time. In some examples, the cooling process can be accelerated by moving a build volume into a cooled environment and/or by blowing cool air over and around the build volume. The time it takes to cool a heated build volume, however, can be two to three times as long as the time it takes to print the build volume. For example, the heated build volume from a twelve hour 3D print job may take as long as twenty four to thirty six hours to cool.

Accordingly, example methods and systems described herein can help to expedite the cooling of a 3D build volume. To reduce the cooling time of a 3D build volume, cooling conduits can be formed within the build volume to improve the conduction of heat from the build volume. In some examples, the cooling conduits can be formed within the build volume at positions determined to be at the center of the mass of the build volume, or at the center mass of the build volume, in order to improve the conduction of heat out of the greatest amount of mass of the build volume. A cooling conduit can be formed in the build volume by including a 3D placeholder part with other 3D parts in a 3D print job so that the placeholder part can be printed and fused within the build volume along with the other 3D parts from the 3D print job. The 3D placeholder part comprises a sacrificial 3D part generated by the system that can be removed from the build volume after printing is completed. Removal of the placeholder part can form a void in the build volume that serves as a cooling conduit that is substantially free from non-fused build material. A 3D placeholder part can be positioned within the build volume such that it extends into the build volume from a side of the build volume. In some examples, a 3D placeholder part can be positioned to extend through the build volume from one side of the build volume to another opposite side of the build volume. In some examples, a 3D placeholder part can be positioned at the center mass of the build volume. In general, a 3D placeholder part comprises a shape and position within the build volume that enable its subsequent removal (e.g., manual removal) from the build volume in a manner that does not involve fragmenting the build volume and/or disturbing other 3D parts that are printed within the build volume.

Solid placeholder parts can be removed from the build volume, manually for example, when printing is completed. A placeholder part can be positioned with an end adjacent to a side of the build volume and can have a tapered shape or other suitable shape that facilitates its removal from the build volume without fragmenting the build volume and/or disturbing other 3D parts that have been printed within the build volume. Removing a placeholder part can leave behind a void within the build volume that serves as a cooling conduit. In different examples, and depending on the 3D placeholder part, a cooling conduit can extend from a top side of the build volume part way or most of the way into the build volume, or a cooling conduit can extend all the way through the build volume from one opening at a first top side of the build volume to another opening at a second bottom side of the build volume. Through the cooling conduit, heat can be removed from the build volume, for example, by the natural or forced flow of cool air into or through the conduit, by the insertion of a cooling mechanism into the conduit such as a cooling rod that provides natural circulation of a cooling fluid within the cooling rod, or by the insertion into the conduit of a cooling pipe that is open at both ends and extends through the build volume to be coupled at either end to an external cooling system that can continually force cooling fluid to circulate through the cooling pipe.

In a particular example, a method of cooling a 3D build volume includes receiving a 3D object model that represents a 3D part to be formed in a build volume, and determining a placeholder position for forming a placeholder part within the build volume. Based on the placeholder position, a 3D part position is determined for forming the 3D part within the build volume. The method also includes controlling components of a 3D printing system to form the placeholder part in the placeholder position within the build volume and to form the 3D part in the 3D part position within the build volume.

In another example, a 3D printing system to expedite cooling of a 3D build volume, includes a memory to receive a 3D object model that represents a 3D part, and a 3D placeholder model that represents a 3D placeholder, where the 3D part and 3D placeholder are to be printed within a build volume of the 3D printing system. The system includes a processor programmed to determine a 3D placeholder position and a 3D part position based on the 3D placeholder position, where the 3D placeholder position is to locate the 3D placeholder such that it extends through the build volume from a first side of the build volume to a second side of the build volume, opposite the first side. The system further includes print system components controlled by the processor to print the 3D placeholder at the 3D placeholder position and to print the 3D part at the 3D part position.

In another example, a method of cooling a 3D build volume includes positioning a removable 3D placeholder within a build volume, where the removable 3D placeholder comprises an elongated shape that tapers from a wider first end to a narrower second end. The positioning comprises placing the wider first end at the edge of a top side of the build volume and the narrower second end at the edge of a bottom side of the build volume. The method includes printing the removable 3D placeholder in the build volume according to the positioning, and printing a 3D part within the build volume away from the edges of the top side and the bottom side of the build volume.

FIG. 1 shows a block diagram of an example of a 3D printing system 100 suitable for producing a 3D build volume with cooling conduit placeholders to expedite cooling of the 3D build volume. The 3D printing system 100 is shown by way of example and is not intended to represent a complete 3D printing system. Thus, it is understood that an example system 100 may comprise additional components and may perform additional functions not specifically illustrated or discussed herein.

Figure 2:
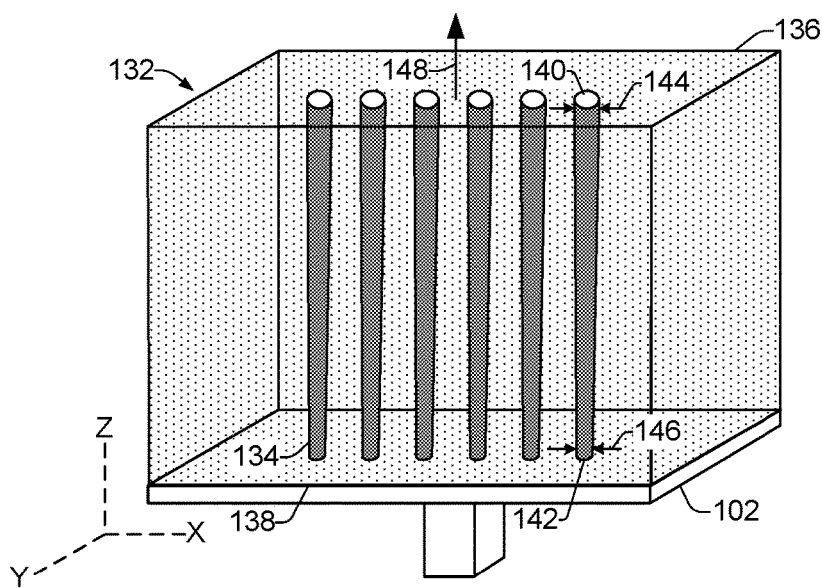
FIG. 2 shows an example of a build volume with example placeholder parts that have been formed in a build area of a 3D printing system.

An example 3D printing system 100 includes a moveable print bed 102, or build platform 102 to serve as the floor to a work space or build area 103 in which 3D parts can be printed. In some examples the print bed 102 can move in a vertical direction (i.e., up and down) in the z-axis direction. The build area 103 of a 3D printing system 100 generally refers to a volumetric work space that develops above the moveable print bed 102 as the print bed moves vertically downward during a 3D printing process in which layers of powdered build material can be successively spread over the bed and processed to form 3D parts within a build volume, such as the build volume 132 shown in FIG. 2. FIG. 2 shows an example of a build volume 132 with example placeholder parts 134 that have been formed in a build area 103 of a 3D printing system 100. In order to facilitate this description, the build volume 132 shown in FIG. 2 does not illustrate 3D parts that would generally also be printed within the build volume, such as the example 3D parts 150 shown in FIG. 3.

An example 3D printing system 100 also includes a powdered build material distributor 104 that can provide a layer of powder over the print bed 102. In some examples, a suitable powdered build material can include PA12 build material commercially known as V1R10A "HP PA12" available from HP Inc. The powder distributor 104 can include a powder supply and powder spreading mechanism such as a roller or blade to move across the print bed 102 in the x-axis direction to spread a layer of powder.

A liquid agent dispenser 106 can deliver a liquid functional agent such as a fusing agent and/or detailing agent from a fusing agent dispenser 106a and detailing agent dispenser 106b, respectively, in a selective manner onto areas of a powder layer provided on the print bed 102. In some examples, a suitable fusing agent can include an ink-type formulation comprising carbon black, such as the fusing agent formulation commercially known as V1Q60Q "HP fusing agent" available from HP Inc. In different examples, fusing agent formulations can also comprise an infrared light absorber, a near infra-red light absorber, a visible light absorber, and a UV light absorber. Inks comprising visible light enhancers can include dye based colored ink and pigment based colored ink, such as inks commercially known as CE039A and CE042A available from HP Inc. An example of a suitable detailing agent can include a formulation commercially known as V1Q61A "HP detailing agent" available from HP Inc. Liquid agent dispensers 106 can include, for example, a printhead or printheads, such as thermal inkjet or piezoelectric inkjet printheads. In some examples, a printhead dispenser 106 can comprise a pagewide array of liquid ejectors (i.e., nozzles) that spans across the full y-axis dimension of the print bed 102 and moves bi-directionally (i.e., back and forth) in the x-axis as indicated by direction arrow 107 while it ejects liquid droplets onto a powder layer spread over the print bed 102. In other examples, a printhead dispenser 106 can comprise a scanning type printhead. A scanning type printhead can span across a limited portion or swath of the print bed 102 in the y-axis dimension as it moves bi-directionally in the x-axis as indicated by direction arrow 107, while ejecting liquid droplets onto a powder layer spread over the print bed 102. Upon completing each swath, a scanning type printhead can move in the y-axis direction as indicated by direction arrow 109 in preparation for printing another swath of the powder layer on print bed 102.

The example 3D printing system 100 also includes a fusing energy source 108, such as radiation source 108, that can apply radiation R to powder layers on the print bed 102 to facilitate the heating and fusing of the powder. In some examples, the energy source 108 can comprise a scanning energy source that scans across the print bed 102 in the x-axis direction. In some examples, where a 3D printing system comprises a binder jetting system that can print a liquid binder agent onto different materials such as metals, ceramics, and plastics, for example, the system 100 can include a binder agent drying/curing unit (not shown).

Referring still to FIG. 1, an example 3D printing system 100 additionally includes an example controller 110. The example controller 110 can control various components and operations of the 3D printing system 100 to facilitate the printing of 3D parts as generally described herein, such as controllably spreading powder onto the print bed 102, selectively applying/printing fusing agent and detailing agent to portions of the powder, and exposing the powder to radiation R. In addition, the controller 110 can further control components and operations of the 3D printing system 100 to print a removable 3D placeholder part whose shape and position within a build volume enable formation of a cooling conduit to expedite cooling of the build volume upon removal of the 3D placeholder part from the build volume.

As shown in FIG. 1, an example controller 110 can include a processor (CPU) 112 and a memory 114. The controller 110 may additionally include other electronics (not shown) for communicating with and controlling various components of the 3D printing system 100. Such other electronics can include, for example, discrete electronic components and/or an ASIC (application specific integrated circuit). Memory 114 can include both volatile (i.e., RAM) and nonvolatile memory components (e.g., ROM, hard disk, optical disc, CD-ROM, flash memory, etc.). The components of memory 114 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 112 of the 3D printing system 100.

As shown in the example controller 110 of FIG. 1, an example of executable instructions to be stored in memory 114 can include instructions associated with modules 120, 122, 126, and 130, while an example of stored data received and/or generated by controller 110 can include 3D object model data 116, 3D placeholder model data 118, determined part position data 124, and scaled 2D slice data 130. Thus, a 3D printing system 100 can receive a 3D object model 116 that represents a part to be printed. The 3D printing system 100 can also receive a 3D placeholder model 118 that represents a placeholder part to be printed that is subsequently removable from a build volume to provide a cooling conduit within the build volume. The 3D object model 116 and 3D placeholder model 118 can be received in a 3D file format such as 3MF, for example. The 3D object model 116 and 3D placeholder model 118 can include geometric information that describes the shapes and dimensions of respective 3D parts and 3D placeholders to be printed within a build volume, as well as information indicating colors, surface textures, build material types, the position for printing the 3D parts and placeholders within the build volume, and so on. In some examples, information about 3D parts and 3D placeholders, such as position information, can be received independent of a 3D object model 116 and 3D placeholder model 118, for example, as information stored in memory 114 that is input by a user or by another source.

Figure 3:
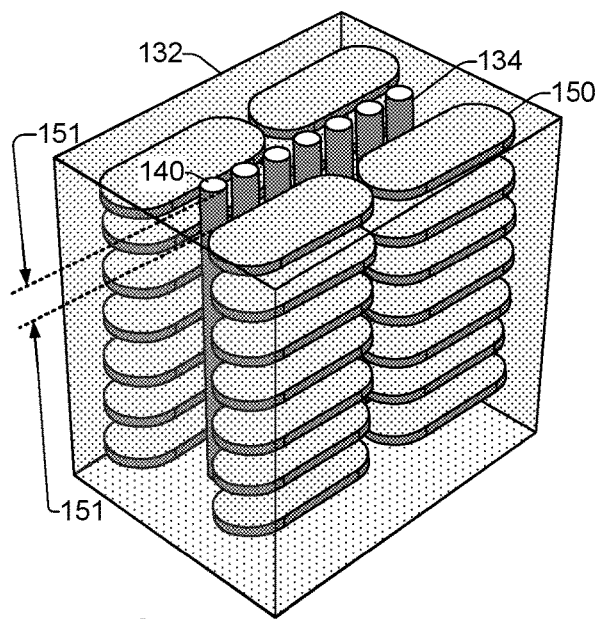
FIG. 3 shows an example of a build volume with example placeholder parts having ends printed to the top side the build volume and positioned at the center mass of the build volume with 3D parts positioned around the placeholder parts.

In some examples, when the 3D printing system 100 receives a 3D object model 116 and 3D placeholder model 118, the processor 112 can execute instructions from a placeholder position module 120. The placeholder position module 120 executes to determine a position within the build volume to print the 3D placeholder or placeholders, such as the placeholders 134 shown in the build volume 132 of FIG. 2. The position within the build volume can be based on positioning information received with the 3D placeholder model 118, or received independently from a user, for example. Positioning information can include, for example, X, Y, and Z, axis coordinates that locate placeholder parts 134 to be printed within a build volume 132. As noted above, placeholder parts can be of a shape, and can be positioned within the build volume 132, to facilitate their removal from the build volume (e.g., manually) in a manner that does not involve fragmenting the build volume and/or disturbing other 3D parts that are printed within the build volume. For example, placeholder parts 134 can be positioned within a build volume 132 such that they extend into the build volume from a first side 136 (i.e., a top side 136) of the build volume toward a second side 138 (i.e., a bottom side 138) of the build volume. In some examples, placeholder parts 134 can be positioned to extend through the build volume all the way from the top side 136 of the build volume and all the way to the bottom side 138 of the build volume. By contrast, 3D printed parts generally do not extend all the way to the top side 136 or bottom side 138 of the build volume because of a thermal insulating thickness of non-fused powder layers that are used to cover the 3D parts and provide thermal insulation, for example, during cooling. Thus, placeholder parts 134 can be printed right up to the edge of the top side 136 of the build volume, and all the way down to the edge of the bottom side 138 of the build volume, which can help to facilitate their removal from the build volume by providing better physical access to the placeholder parts 134. FIG. 3 shows an example of a build volume 132 with example placeholder parts 134 having an end 140 printed right up to the edge of the top side 136, and with example 3D parts 150 that are printed below the surface of the top side 136 under an insulative thickness of non-fused powder layers 151. The upper portions of the placeholder parts 134 (i.e., near the ends 140 of the placeholder parts 134) that extend up through the non-fused powder layers 151 can provide improved physical access to the placeholder parts 134 when they are being removed from the build volume.

In some examples, a placeholder part 134 or group of placeholder parts 134 can be positioned at the center mass of the build volume to provide for cooling conduits that more efficiently remove heat from a larger mass of the build volume. The shape of a placeholder 134 can be a straight, elongated shape with a dimension that extends part way, or all the way through the build volume. Placeholders 134 can be shaped to correspond with the shapes of cooling mechanisms (e.g., cooling rods, cooling pipes) that may be subsequently inserted into the voids or cooling conduits that are left behind in the build volume by the removal of the placeholders. In some examples, the placeholder 134 can comprise a cylindrical shape. The shape of a placeholder 134 can be tapered from a first end 140 to a second end 142. For example, as shown in FIG. 2, the width 144 at the first or top end 140 of a placeholder 134 can be greater than the width 146 at the second or bottom end 142 of the placeholder 134. The tapered shape of the placeholder 134, in addition to its positioning with at least one end 140 printed right up to and directly adjacent to the edge of the top side 136 of the build volume, facilitate the removal of the placeholder from the build volume (e.g., manually) in a direction indicated by direction arrow 148. In some examples, removing the placeholder parts 134 can be performed manually by physically loosening the placeholder parts 134 within the build volume 132 and then pulling them out of the build volume in a direction indicated by direction arrow 148. Careful removal of the placeholders can prevent fragmenting the build volume and/or disturbing other 3D parts 150 (e.g., see FIG. 3) that are printed within the build volume.

The processor 112 can further execute instructions from a 3D part position module 122. The part position module 122 executes to determine a position within the build volume to print 3D parts, such as the 3D parts 150 shown in the build volume 132 of FIG. 3. As noted above, FIG. 3 shows an example of a build volume 132 with example placeholder parts 134 having an end 140 printed right up to the edge of the top side 136. In addition, FIG. 3 shows the example placeholder parts 134 positioned at the center mass of the build volume with 3D parts 150 positioned around the placeholder parts 134. The part position module 122 executes to determine a position within the build volume to print 3D parts in consideration of the position or positions of the placeholders 134 as determined by the placeholder position module 120, discussed above. For example, the part position module 122 can determine positions for the 3D parts 150 that distribute the parts evenly around the placeholders 134 to efficiently utilize the remaining space within the build volume around the placeholders 134. Thus, the positions of the 3D parts 150 to be printed in the build volume depend to some extent on the positioning of placeholders 134.

Referring generally to FIGS. 1-3, when the positions of the placeholder parts 134 and 3D parts 150 have been determined, a processor 112 executing instructions from the 2D slice generator module 126 can process the 3D object model 116 and 3D placeholder model 118 according to the determined positions to generate the 2D slice data 128 for printing the placeholders and other 3D parts in their respective positions within a build volume. The processor 112 can then further execute instructions from the render module 130 to process the 2D slice data 128 and generate 3D print system commands that can control the operation of components of the 3D printing system 100 in order to print layers of both the placeholder parts 134 and the 3D parts 150 according to their determined positions.

Figure 4:
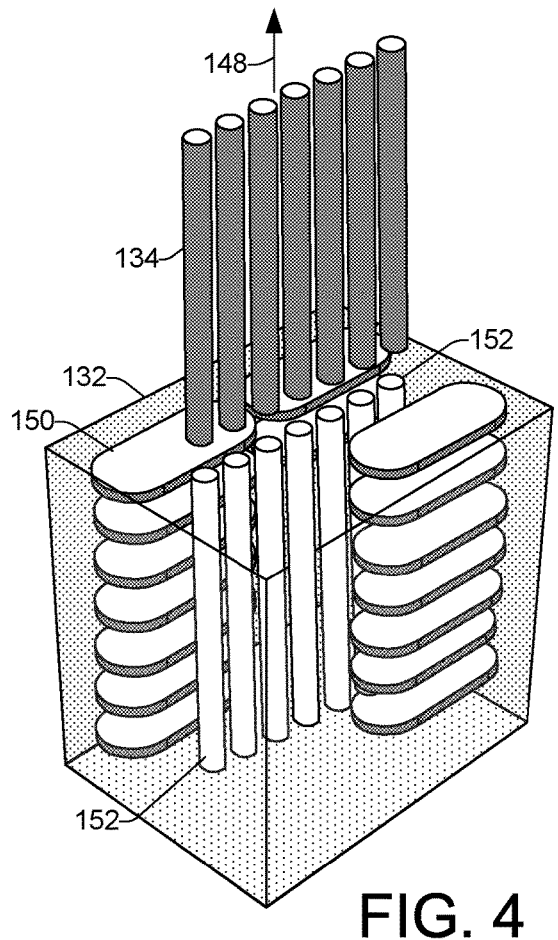
FIG. 4 shows an example of a heated build volume shortly after printing, where example placeholder parts have been removed.

FIG. 4 shows an example of a heated build volume 132 shortly after printing where the example placeholder parts 134 have been removed. Removal of the placeholders 134 leaves behind voids 152 in the build volume that can serve as cooling conduits 152 to expedite the cooling of the build volume. FIG. 4 shows some of the example 3D parts 150 positioned as discussed above around the cooling conduits 152. However, for the purpose of better illustrating the cooling conduits 152, some of the example 3D parts 150 shown in FIG. 3 have been left out of FIG. 4. Although not specifically illustrated in FIG. 4, the cooling conduits 152 can have a tapered shape that matches the tapered shape of the placeholder parts 134 shown in FIG. 2. As noted above, removing the placeholder parts 134 can be performed manually by physically loosening the placeholder parts 134 within the build volume and then pulling them out of the build volume in a direction indicated by direction arrow 148.

Figure 5:
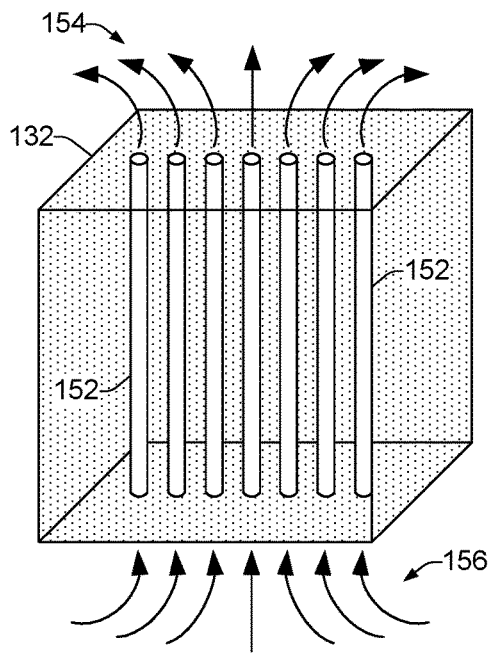
FIG. 5 shows example cooling conduits formed in a build volume that can remove heat from the build volume by a natural or forced flow of air through cooling conduits.
Figure 6:
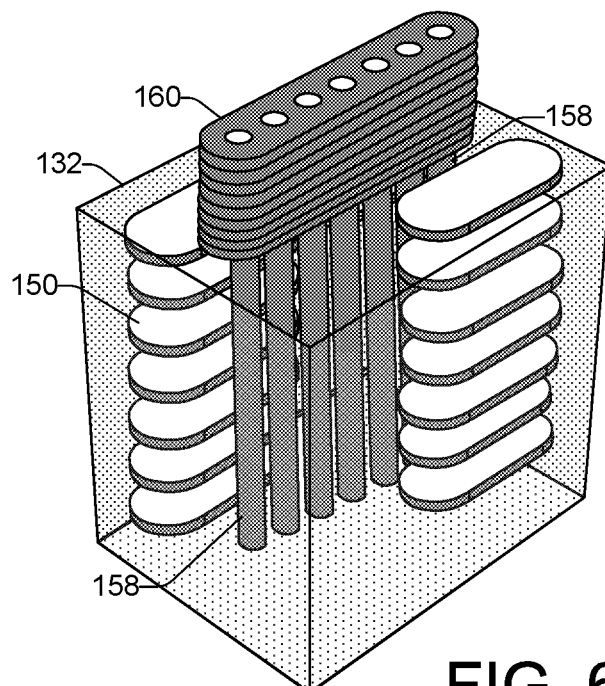
FIG. 6 shows example cooling rods that can be inserted into cooling conduits to cool a build volume.
Figure 7:
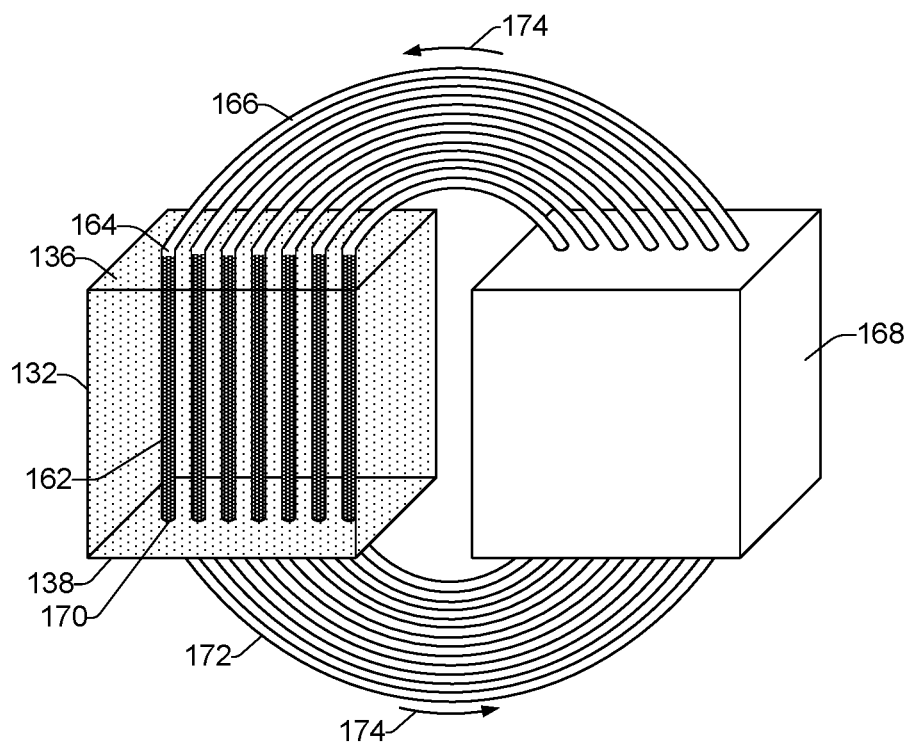
FIG. 7 shows an example of cooling pipes inserted into cooling conduits to expedite cooling of a build volume; and, FIGS. 8, 9, and 10, are flow diagrams showing example methods of cooling a 3D build volume from a 3D printing system.

FIGS. 5, 6, and 7, show some examples of how the cooling conduits 152 can be employed to expedite the cooling of a build volume 132 after the 3D printing process is complete and the placeholder parts have been removed. FIG. 5 shows example cooling conduits 152 formed in the build volume 132 that can remove heat from the build volume by a natural or forced flow of air 154, 156, through the conduits 152. Although not specifically illustrated in FIG. 5, the cooling conduits 152 can have a tapered shape that matches the tapered shape of the placeholder parts 134 shown in FIG. 2. In order to better illustrate cooling conduits 152, there are no 3D parts 150 shown within the build volume 132 in FIG. 5. In some examples, natural convection can cause a flow of heated air 154 from the top side of build volume 132 upward and out of the cooling conduits 152, as cooler air 156 is drawn into the cooling conduits 152 from the bottom side of the build volume. In some examples, an external cooling fan (not shown) can provide a forced flow of air 154, 156, through the conduits 152 to increase the cooling of the build volume.

As shown in FIGS. 6 and 7, different cooling mechanisms can also be inserted into cooling conduits 152 to further expedite cooling of the build volume 132. For example, FIG. 6 shows example cooling rods 158 that can be inserted into the cooling conduits 152 to cool the build volume 132. In order to better illustrate the example cooling rods 158, some of the example 3D parts 150 shown in FIG. 3 are not illustrated in FIG. 6. Although not specifically illustrated in FIG. 6, the cooling rods 158 can have a tapered shape that matches the tapered shape of the placeholder parts 134 shown in FIG. 2. A lower portion of the cooling rods 158 can be inserted into the cooling conduits 152 to act as a heat source, while an upper portion of the rods remain above the build volume 132 and act as a heat sink. Example cooling rods 158 can contain cooling fluid inside, that naturally circulates within the rods to remove heat from the build volume. Natural circulation of cooling fluid within the rods can occur as fluid within the inserted, lower heat source portions of the rods absorbs heat from the build volume and expands, becoming less dense. The heated fluid rises into the non-inserted, upper heat sink portions of the rods where the heat is exchanged through the walls of the rods into the surrounding cooler atmosphere. As the heated fluid in the upper portions of the rods cools, it becomes more dense and falls back down into the lower heat source portions of the rods. Thus, the cooling rods 158 provide a closed system that continuously circulates the cooling fluid within the rods to cool the build volume. In some examples, as shown in FIG. 6, the non-inserted, upper heat sink portions of the rods 158 can comprise heat distribution fins 160 that are brazed or otherwise joined to the rods to provide a more efficient and faster distribution of heat from the rods.

FIG. 7 shows an example of cooling pipes 162 inserted into the cooling conduits 152 to expedite cooling of the build volume 132. In order to better illustrate the example cooling pipes 162, there are no 3D parts 150 shown within the build volume 132 in FIG. 7. Although not specifically illustrated in FIG. 7, the cooling pipes 162 can have a tapered shape that matches the tapered shape of the placeholder parts 134 shown in FIG. 2. The cooling pipes 162 can be inserted into the cooling conduits 152 and can extend fully through the build volume 132 from a first side 136 of the build volume to a second opposite side 138 of the build volume. A first end 164 of each cooling pipe 162 positioned directly adjacent to the first side 136 of the build volume can comprise a first opening coupled to a cooled fluid input tube 166 that is in turn coupled to an external fluid cooling device 168. A second end 170 of each cooling pipe 162 positioned directly adjacent to the second side 138 of the build volume can comprise a second opening coupled to a heated fluid output tube 172 that is in turn coupled to the external fluid cooling device 168. Cooling device 168 can provide forced movement of a cooling fluid in the direction of arrows 174. The cooling device 168 can receive cooling fluid that has been heated up within the cooling pipes 162 through heated fluid output tubes 172. The cooling device 168 can cool the heated fluid and force cooled fluid back through the cooling pipes 162 via the cooled fluid input tubes 166. The continuous circulation of cooling fluid through the cooling pipes and through the cooling device 168 can expedite the cooling of the build volume.

Figure 8:
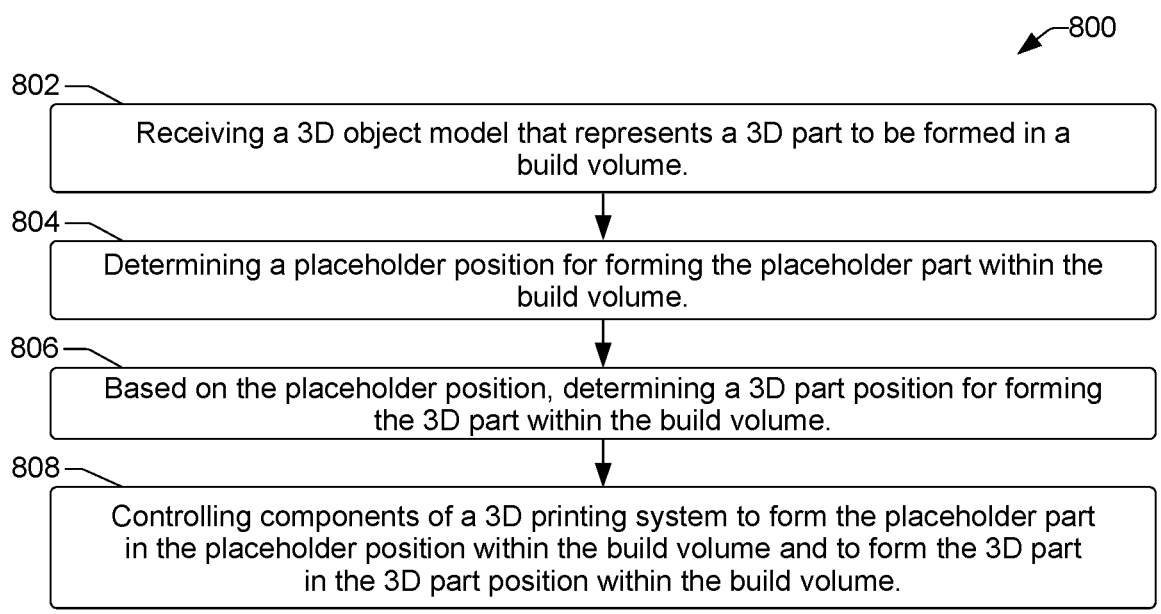
Figure 9:
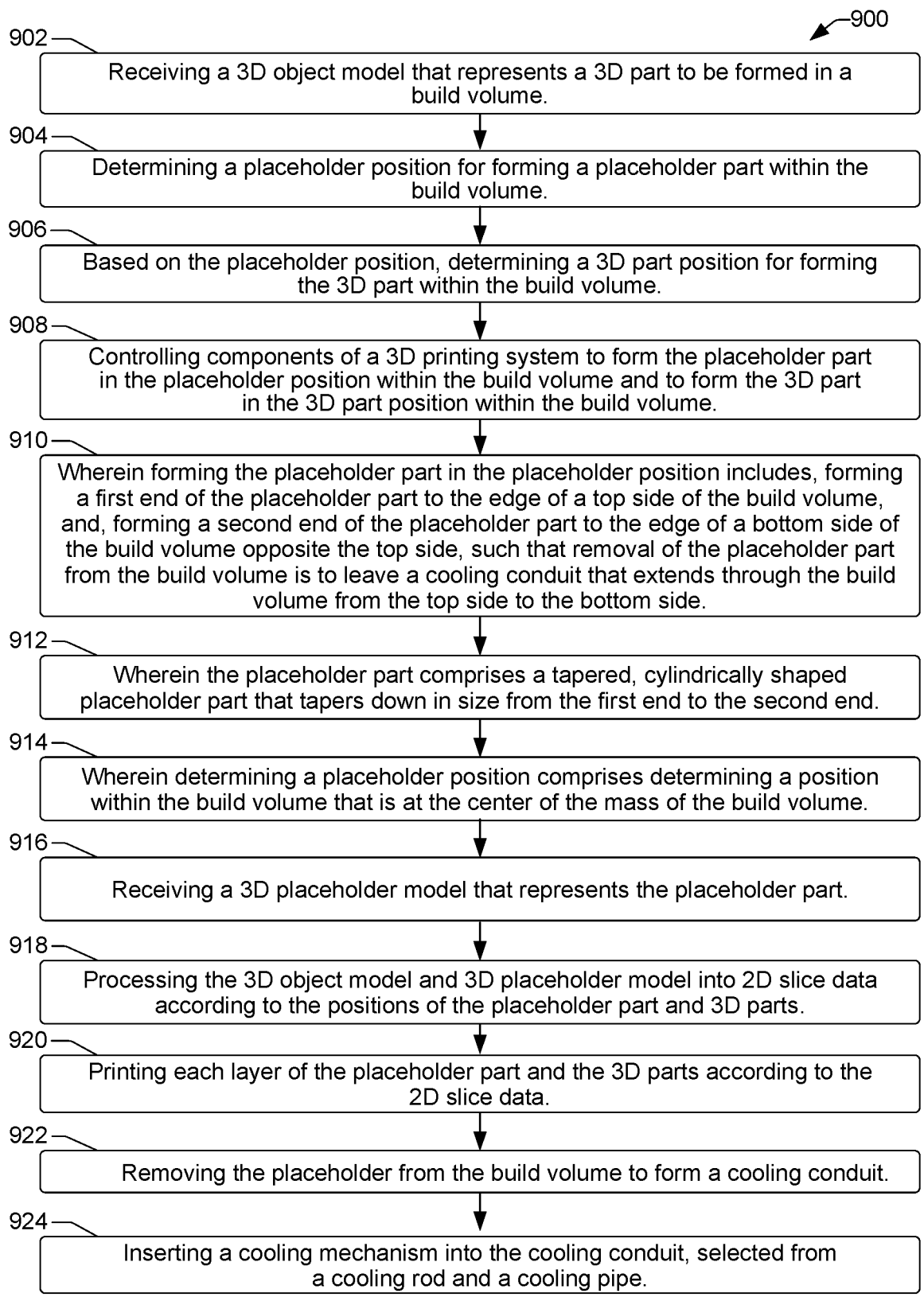
Figure 10:
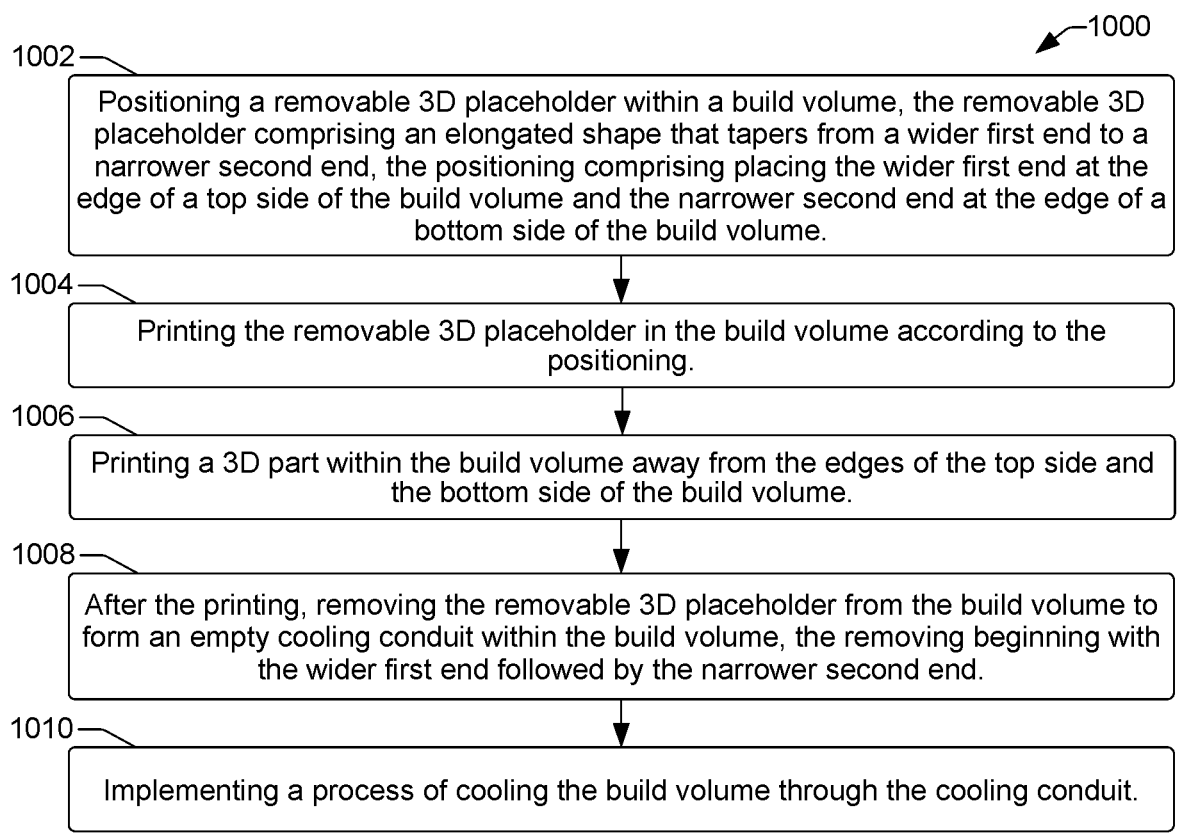

FIGS. 8, 9, and 10, are flow diagrams showing example methods 800, 900, and 1000, respectively, of cooling a 3D build volume from a 3D printing system. Method 900 comprises extensions of method 800 and incorporates additional details of method 800. Methods 800-1000 are associated with examples discussed above with regard to FIGS. 1-7, and details of the operations shown in methods 800-1000 can be found in the related discussion of such examples. The operations of methods 800-1000 may be embodied as programming instructions stored on a non-transitory, machine-readable (e.g., computer/processor-readable) medium, such as memory/storage 114 shown in FIG. 1. In some examples, implementing the operations of methods 800-1000 can be achieved by a controller, such as a controller 110 of FIG. 1, reading and executing the programming instructions stored in a memory 114. In some examples, implementing the operations of methods 800-1000 can be achieved using an ASIC and/or other hardware components alone or in combination with programming instructions executable by a controller 110.

The methods 800-1000 may include more than one implementation, and different implementations of methods 800-1000 may not employ every operation presented in the respective flow diagrams of FIGS. 8-10. Therefore, while the operations of methods 800-1000 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing other subsequent operations, while another implementation of method 800 might be achieved through the performance of all of the operations.

Referring now to the flow diagram of FIG. 8, an example method 800 of cooling a 3D build volume begins at block 802 with receiving a 3D object model that represents a 3D part to be formed in a build volume. As shown at blocks 804 and 806, respectively, the method can include determining a placeholder position for forming a placeholder part within the build volume, and based on the placeholder position, determining a 3D part position for forming the 3D part within the build volume. As shown at block 808, the method can also include controlling components of a 3D printing system to form the placeholder part in the placeholder position within the build volume and to form the 3D part in the 3D part position within the build volume.

Referring now to the flow diagram of FIG. 9, an example method 900 comprises extensions of method 800 and incorporates additional details of method 800. Thus, method 900 comprises a method of cooling a 3D build volume which begins at block 902 with receiving a 3D object model that represents a 3D part to be formed in a build volume. As shown at blocks 904 and 906, respectively, the method can include determining a placeholder position for forming a placeholder part within the build volume, and based on the placeholder position, determining a 3D part position for forming the 3D part within the build volume. As shown at block 908, the method can also include controlling components of a 3D printing system to form the placeholder part in the placeholder position within the build volume and to form the 3D part in the 3D part position within the build volume.

As shown at block 910, in some examples of method 900, forming the placeholder part in the placeholder position can include forming a first end of the placeholder part to the edge of a top side of the build volume, and forming a second end of the placeholder part to the edge of a bottom side of the build volume opposite the top side, such that removal of the placeholder part from the build volume is to leave a cooling conduit that extends through the build volume from the top side to the bottom side. In some examples, the placeholder part comprises a tapered, cylindrically shaped placeholder part that tapers down in size from the first end to the second end, as shown at block 912. In some examples of method 900, determining a placeholder position can include determining a position within the build volume that is at the center of the mass of the build volume, as shown at block 914. As shown at blocks 916, 918, and 920, respectively, the method can also include receiving a 3D placeholder model that represents the placeholder part, processing the 3D object model and 3D placeholder model into 2D slice data according to the positions of the placeholder part and 3D parts, and printing each layer of the placeholder part and the 3D parts according to the 2D slice data. The method can include removing the placeholder part from the build volume to form a cooling conduit, as shown at block 922, and inserting a cooling mechanism into the cooling conduit such as a cooling rod or a cooling pipe, as shown at block 924.

Referring now to the flow diagram of FIG. 10, another example method 1000 of cooling a 3D build volume begins at block 1002 with positioning a removable 3D placeholder within a build volume, where the removable 3D placeholder comprises an elongated shape that tapers from a wider first end to a narrower second end, and where the positioning comprises placing the wider first end at the edge of a top side of the build volume and the narrower second end at the edge of a bottom side of the build volume. The method 1000 also includes, printing the removable 3D placeholder in the build volume according to the positioning, and printing a 3D part within the build volume away from the edges of the top side and the bottom side of the build volume, as shown at blocks 1004 and 1006, respectively. As shown at block 1008, the method can include, after the printing, removing the removable 3D placeholder from the build volume to form an empty cooling conduit within the build volume, where the removing begins with the wider first end followed by the narrower second end. As shown at block 1010, the method can also include implementing a process of cooling the build volume through the cooling conduit, including for example, inserting a cooling mechanism into the cooling conduit such as a cooling rod or a cooling pipe.

What is claimed is:

1. A method of cooling a 3D build volume comprising:
receiving a 3D object model that represents a 3D part to be formed in a build volume of build material;
determining a placeholder position for forming a placeholder part within the build volume, wherein forming the placeholder part in the placeholder position comprises forming a first end of the placeholder part to the edge of a top side of the build volume and forming a second end of the placeholder part to the edge of a bottom side of the build volume opposite the top side;
based on the placeholder position, determining a 3D part position for forming the 3D part within the build volume; and,
controlling components of a 3D printing system to form the placeholder part in the placeholder position within the build volume and to form the 3D part in the 3D part position within the build volume.

2. A method as in claim 1, wherein the placeholder part comprises a tapered, cylindrically shaped placeholder part that tapers down in size from the first end to the second end.

3. A method as in claim 1, wherein determining a placeholder position comprises determining a position within the build volume that is at the center of the mass of the build volume.

4. A method as in claim 1, further comprising:
receiving a 3D placeholder model that represents the placeholder part;
processing the 3D object model and 3D placeholder model into 2D slice data according to the positions of the placeholder part and 3D parts; and,
printing each layer of the placeholder part and the 3D parts according to the 2D slice data.

5. A method as in claim 1, further comprising:
removing the placeholder part from the build volume to form a cooling conduit; and,
inserting a cooling mechanism into the cooling conduit.

6. A method as in claim 5, wherein inserting a cooling mechanism into the cooling conduit comprises inserting a cooling mechanism selected from a cooling rod to cool the build volume by natural circulation of cooling fluid within the rod, and a cooling pipe to cool the build volume by forced circulation cooling fluid through an external cooling device.

7. A 3D printing system to expedite cooling of a 3D build volume, comprising:
a memory to receive a 3D object model that represents a 3D part, and a 3D placeholder model that represents a 3D placeholder, the 3D part and 3D placeholder to be printed within a build volume of the 3D printing system;
a processor programmed to determine a 3D placeholder position and a 3D part position based on the 3D placeholder position, the 3D placeholder position and the 3D part position distributed around and apart from one another, and the 3D placeholder position to locate the 3D placeholder to extend through the build volume from a first side of the build volume to a second side of the build volume, opposite the first side; and,
print system components controlled by the processor to print the 3D placeholder at the 3D placeholder position and to print the 3D part at the 3D part position.

8. A 3D printing system as in claim 7, wherein the processor is programmed to generate 2D slice data of the 3D object model and the 3D placeholder model according to the determined 3D placeholder position and the 3D part position, and to generate print system commands to control operation of the print system components to print the 3D placeholder at the 3D placeholder position and to print the 3D part at the 3D part position.

9. A 3D printing system as in claim 7, wherein the 3D placeholder comprises an elongated tapered shape that narrows from a first end to a second end such that the 3D placeholder is removable from the build volume beginning at the first end and followed by the second end.

10. A 3D printing system as in claim 7, wherein the 3D placeholder position is to further locate the 3D placeholder at a center of the mass of the build volume.

11. A 3D printing system as in claim 7, wherein the print system components comprise:

a powdered build material distributor to supply and spread layers of powdered build material onto a build platform;

the build platform, to receive the layers of powdered build material and to move in a vertically downward direction with each successive layer to increase a build area size;

a liquid agent dispenser to print a fusing agent onto selected areas of each layer, the selected areas defining portions of the layer that are to form a layer of the 3D part and the 3D placeholder; and, a fusing energy source to apply radiation to each layer to heat the printed areas and fuse together the powdered build material within the printed areas.

12. A method of cooling a 3D build volume comprising:

positioning a removable 3D placeholder within a build volume, the removable 3D placeholder comprising an elongated shape that tapers from a wider first end to a narrower second end, the positioning comprising placing the wider first end at the edge of a top side of the build volume and the narrower second end at the edge of a bottom side of the build volume;

printing the removable 3D placeholder in the build volume according to the positioning; and, printing a 3D part within the build volume apart from the removable 3D placeholder and away from the edges of the top side and the bottom side of the build volume.

13. A method as in claim 12, further comprising:

after the printing, removing the removable 3D placeholder from the build volume to form an empty cooling conduit within the build volume, the removing beginning with the wider first end followed by the narrower second end.

14. A method as in claim 13, further comprising implementing a process of cooling the build volume through the cooling conduit.

* * * * *